US008479628B2

(12) United States Patent
Dale et al.

(10) Patent No.: US 8,479,628 B2

(45) Date of Patent: Jul. 9, 2013

(54) PORTABLE SAWMILL

(75) Inventors: Peter Dale, Orillia (CA); Luc Belzile, Petit-Shippigan (CA)

(73) Assignee: Norwood Industries, Inc., Kilworthy (CA)

( * ) Notice: Subject to any disclaimer, the term of this patent is extended or adjusted under 35 U.S.C. 154(b) by 0 days.

(21) Appl. No.: 12/556,983

(22) Filed: Sep. 10, 2009

(65) Prior Publication Data

US 2010/0132839 A1 Jun. 3, 2010

Related U.S. Application Data

(63) Continuation of application No. 11/398,221, filed on Apr. 5, 2006, now abandoned.

(51) Int. Cl.

*B26D 5/08* (2006.01)
*B26D 1/18* (2006.01)
*B26D 1/00* (2006.01)
*B23D 53/00* (2006.01)
*B23D 55/00* (2006.01)

(52) U.S. Cl.

USPC ...................... 83/574; 83/794; 83/485; 83/13

(58) Field of Classification Search

USPC ..... 83/102, 574, 794–801, 485–489; 144/378
See application file for complete search history.

(56) References Cited

U.S. PATENT DOCUMENTS

| | | | | |
|---|---|---|---|---|
| 1,846,641 A | * | 2/1932 | Hedgpeth | 83/574 |
| 2,800,932 A | * | 7/1957 | Scott | 83/878 |
| 3,417,884 A | * | 12/1968 | Edwards | 414/508 |
| 3,695,316 A | | 10/1972 | Pluckhahn | |
| 3,926,086 A | | 12/1975 | Crane | |
| 3,965,788 A | | 6/1976 | Granberg | |
| 4,111,085 A | | 9/1978 | Johnson | |
| 4,210,049 A | | 7/1980 | Gauthier | |
| 4,235,140 A | * | 11/1980 | Reece | 83/794 |
| 4,245,535 A | | 1/1981 | Lockwood et al. | |
| 4,275,632 A | | 6/1981 | Ross | |
| 4,300,428 A | | 11/1981 | Woodland | |
| 4,307,641 A | | 12/1981 | Shapleigh | |
| 4,327,785 A | * | 5/1982 | McIlrath | 144/133.3 |
| 4,559,858 A | * | 12/1985 | Laskowski et al. | 83/801 |
| 4,561,336 A | * | 12/1985 | Davis | 83/859 |
| 4,640,170 A | * | 2/1987 | Bakken | 83/794 |
| 4,694,720 A | * | 9/1987 | Brickner et al. | 83/471.3 |
| 5,144,994 A | * | 9/1992 | Stecker, Sr. | 144/286.5 |
| 5,213,022 A | * | 5/1993 | Elgan | 83/797 |
| 5,243,892 A | | 9/1993 | Jindra | |
| 5,577,429 A | * | 11/1996 | Noble | 83/468.4 |
| 5,784,941 A | * | 7/1998 | Sanborn | 83/794 |
| 5,865,228 A | * | 2/1999 | Patterson | 144/1.1 |

(Continued)

FOREIGN PATENT DOCUMENTS

| | | | |
|---|---|---|---|
| AU | 200039444 B2 | * | 1/2001 |
| CA | 1 200 180 | | 2/1986 |

*Primary Examiner* — Ghassem Alie

*Assistant Examiner* — Bharat C Patel

(74) *Attorney, Agent, or Firm* — Volpe and Koenig, P.C.

(57) ABSTRACT

A method for constructing a base for holding a moving sawhead along a linear path using a ladder with a carriage base attached thereto is disclosed. A vertical slide is attached to the carriage base and also attached to the powered sawhead so that the blade is capable of cutting in a generally horizontal plane.

9 Claims, 17 Drawing Sheets

U.S. PATENT DOCUMENTS

| | | | | |
|---|---|---|---|---|
| 6,038,954 | A | 3/2000 | Keener | |
| 6,131,628 | A | 10/2000 | Chiang | |
| 6,155,318 | A * | 12/2000 | Underwood | 144/286.1 |
| 6,240,987 | B1 * | 6/2001 | Birkeland | 144/286.1 |
| 6,505,659 | B1 | 1/2003 | Hummel | |
| 6,899,306 | B1 * | 5/2005 | Huang | 248/150 |
| 7,240,705 | B2 * | 7/2007 | Alger | 144/286.5 |
| 7,845,469 | B1 * | 12/2010 | Butler et al. | 182/129 |
| 2006/0117926 | A1 | 6/2006 | Dale et al. | |
| 2007/0240937 | A1 * | 10/2007 | Borgstede | 182/129 |

* cited by examiner

PORTABLE SAWMILL

CROSS REFERENCE TO RELATED APPLICATION

This application is a continuation of U.S. patent application Ser. No. 11/398,221, filed Apr. 5, 2006, which is incorporated by reference as if fully set forth.

FIELD OF THE INVENTION

The present invention relates to a portable sawmill having a cutting mechanism for sawing lumber.

BACKGROUND OF THE INVENTION

There are several prior inventions for portable sawmills.

U.S. Pat. No. 5,784,941 describes a portable sawmill in which the functions of adjusting a cut and making a cut are divided between two separate devices. The invention discloses a vertical chain saw, ideally operated in an upward direction. The invention also discloses a dedicated internal monorail track, with wheels both above and below the track. The invention also discloses a throttle actuator, attached to a side of the frame or track.

U.S. Pat. No. 5,243,892 discloses a portable sawmill with a frame base and an inverted U-shaped frame, supported by a carriage rolling along side tracks defined by the frame base. The chain saw is supported by a transversely slidable holder on the cross-beam of the frame. The chain saw is oriented in a vertical direction, and, in use, the log is placed on the U-shaped frame.

U.S. Pat. No. 4,640,170 discloses a portable saw mill with a frame that surrounds the log. The frame is dragged or slid along a frame supporting surface. The frame holds a chain saw at the two ends of its blade, in horizontal fashion, with chain saw support members. The invention uses sliding means for facilitating the movement of the frame over the log.

U.S. Pat. No. 4,275,632 describes a portable sawmill comprising a U-shaped support or carriage, holding a band saw. When in use, a log is placed between the two guide rails and is supported in place by a jacking mechanism with adjustable shelves. The band saw is in a generally horizontal position, and does not adjust, instead, the log is moved up and down using a jacking mechanism.

U.S. Pat. No. 4,307,641 describes a portable sawmill comprising two skid rails, vertical support members, a pair of guide rails. The chain saw is held below the guide rails.

U.S. Pat. No. 4,300,428 describes a portable sawmill having a frame, a guide member mounted above the frame, and a carriage. The chain saw is mounted above the log, and operates at about a 45 degree angle to the horizontal. The log is moved up and down using logjacks. The guide rail is a monorail.

U.S. Pat. No. 4,235,140 describes a saw mill. Though it does disclose a pair of guide rails, the guide rails are not on the same horizontal plane, and as such the sawmill requires grooved wheels to structurally hold the chain saw in place.

U.S. Pat. No. 3,965,788 describes a saw guide for use with a vertically operated portable chain saw.

U.S. Pat. No. 3,926,086 describes a portable saw mill that uses a complex pulley system to move the chain saw and supporting platform. When in use, a log is placed, and clamped, between the guide rails.

U.S. Pat. No. 3,695,316 describes a portable timber milling jig that uses a carriage, holding a chain saw, axially surrounding a square guide rail. The chain saw is held at an approximately 45 degree angle and only uses one guide rail, and utilizes ball bearings on the carriage to move the carriage with respect to the guide rail. When in use, a log is placed under the guide rail.

Canadian Patent No. 1,200,180 describes a portable saw mill comprising a frame with a guide rail and a carriage moveable along the guide rail. A band saw is supported by the carriage. The carriage is moveable along the guide rail along two sets of wheels, one engaged with the upper side of the guide rail and the other with the lower side.

U.S. Pat. No. 4,245,535 describes a portable sawmill with an elaborate hydraulic apparatus for cutting a log. The chain saw cuts in a vertical motion.

U.S. Pat. No. 4,210,049 describes an “x” frame for holding a log, with a chain saw affixed to the frame in cantilever position for cutting logs crosswise.

There is a need for an improved portable sawmill that is easily displaceable, easily assembled and disassembled into portable components, and which can use generic components as its saw and/or guide rails.

SUMMARY OF THE INVENTION

The portable sawmill of the invention is quick-connect/quick-disconnect and can be carried and operated by one person alone and is suitable for transport in a car, truck, airplane or all-terrain-vehicle trailer to a site where it is used. The sawmill is suitable for use with a conventional ladder as a timber track.

The invention teaches a device for holding and moving a powered sawhead along a linear path comprising a carriage base, having an assembly capable of engaging either a first guide rail or a second guide rail positioned parallel to the first guide rail, and, when engaged to such guide rails extended horizontally, capable of horizontal movement along the guide rails; a vertical post extending from a top end to a bottom end, the post being or capable of being attached at the bottom end to the carriage base; a vertical slide, extending horizontally from the post, capable of vertical displacement along the post, the displacement being lockable; wherein the vertical slide further being capable of being affixed to a powered sawhead having a powered saw blade such that, when the device is assembled and the powered sawhead is affixed, the powered saw blade is capable of cutting in a generally horizontal plane.

Preferrably, a generic ladder is used as the guide rails.

In another embodiment, the invention teaches a device for holding and moving a powered sawhead along a linear path comprising: a carriage base, having a base, an assembly capable of engaging a first guide rail and, when engaged to such a first guide rail extended horizontally, capable of horizontal movement along the first guide rail; an outrigger arm, adjustably connected to the carriage base and having an outrigger assembly, such outrigger assembly capable of engaging a second guide rail and when engaged to such a second guide rail extended horizontally, capable of horizontal movement along the guide rail, wherein the adjustable connection allows for varying, lockable, distances between the carriage base wheel assembly and the outrigger wheel assembly; a vertical post extending from a top end to a bottom end, the post being capable of being attached at the bottom end to the carriage base; a vertical slide, extending horizontally from the post, capable of vertical displacement along the post, the displacement being lockable; wherein the vertical slide further being capable of being affixed to a powered sawhead having a powered saw blade so that, when the device is assembled and the powered sawhead is affixed, the powered saw blade is capable of cutting in a generally horizontal plane.

The vertical slide can be a horizontally projecting sawhead support plate capable of being affixed to the vertical slide and further capable of being affixed to a powered sawhead having a saw blade such that, when the sawhead support is affixed to both the vertical slide and the sawhead, the saw blade is capable of cutting in a generally horizontal plane.

The vertical post and the vertical slide can be of close contact sleeve construction.

In an embodiment, the device of the invention further comprises a throttle handle on the push handle, a cable connecting the throttle handle to a throttle activator, the throttle activator capable of activating a throttle of the powered sawhead.

Any one or more of the guide, carriage base and vertical slide can be reversably quick-connected or quick-disconnected for storage or transport.

The sawhead can be a chainsaw, a circular saw, a bandsaw, or the like.

DETAILED DESCRIPTION OF THE PREFERRED EMBODIMENTS

Figure 1:
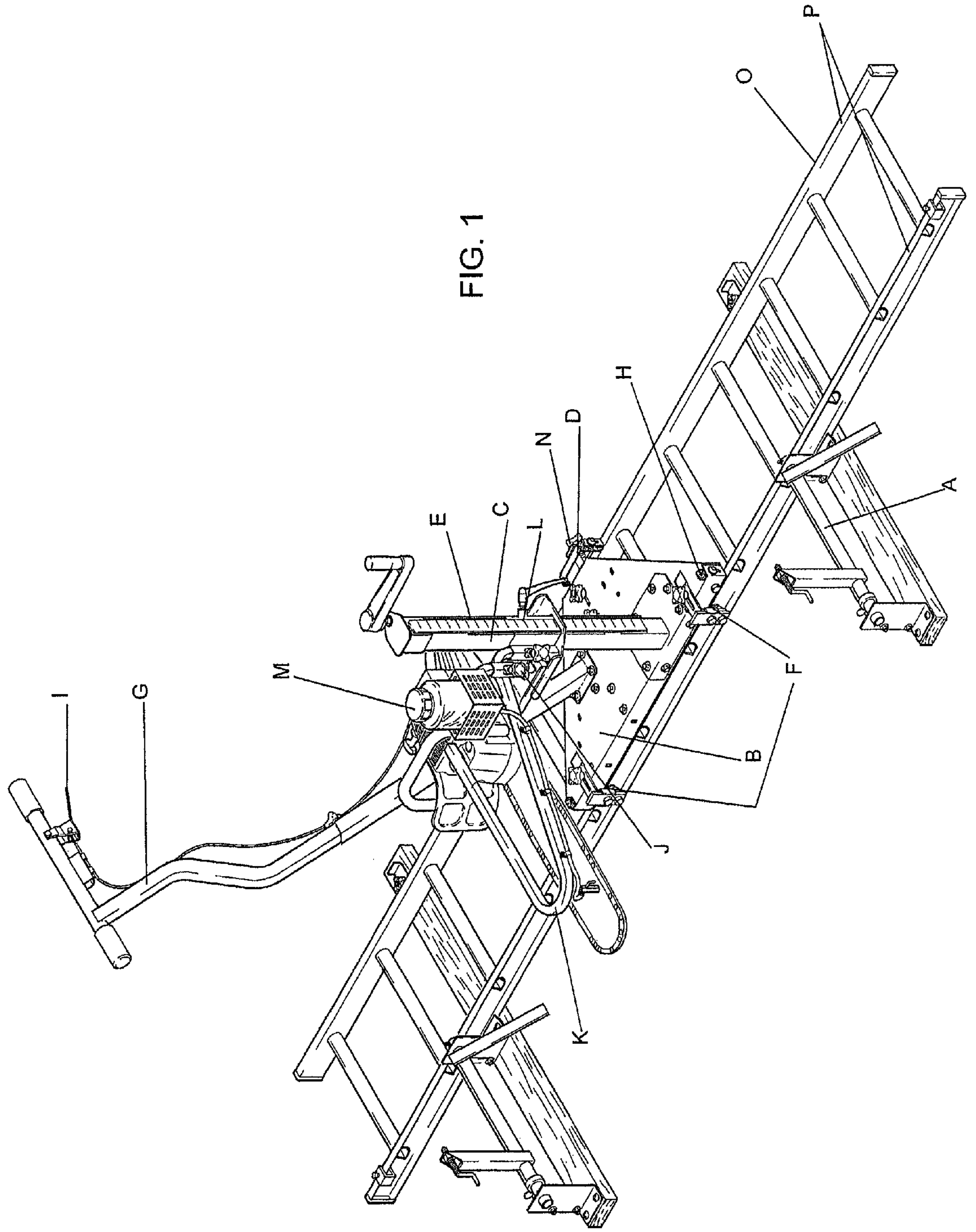
FIG. 1 is a perspective illustration of the assembled sawmill, that is one aspect of the present invention, and is labeled with its major components.

The present invention provides a simple, versatile, cost-effective and portable sawmill which can be readily assembled, disassembled, carried, and used by one person. It is particularly suitable for use by hunters, "do-it-yourselfers", and people situated in remote areas, who need to saw boards, beams, clapboards, shingles, etc. The sawmill's design enables it to be manufactured from extremely sturdy, reasonably inexpensive materials, and permits various types and sizes of chainsaws and ladders (to be used as rail guides) to be utilized.

While there are several prior inventions for portable sawmills, none are as advantageous as the present invention, which has several inventive features not found in the prior art. Notably, the present invention is capable of utilizing a standard, user-supplied ladder as a track for accurately guiding the saw while in use. The present invention is designed to be portable, and easy to assemble or disassemble. The present invention is easy to transport in smaller vehicles such as a car, boat, airplane or all-terrain-vehicle (ATV). The present invention is suitable for use with either a chainsaw sawhead or a bandsaw sawhead. The present invention has an advantageous vertical slide and sawhead support assembly which allows for quick connecting or disconnecting of the sawhead (be it chainsaw or bandsaw) from the sawmill, as well as quick adjustment of the pitch and plane of the saw. The present invention comprises a triangle carriage base with adjustable outrigger arm(s) and twin-flanged wheels, which allows for improved, smoother movement of the saw. In addition, the present invention may comprise a push handle that is quickly connected or disconnected, is adjustable, features a throttle assembly, and can be used to more safely and more comfortably guide the saw. The present invention can also comprise track sweepers which clean the sawmill guide rails while the saw is in use. The present invention is simple and cost-effective to manufacture and use.

Generally, the portable sawmill comprises a pair of horizontally-positioned guide rails generally parallel to one another, a carriage base that rides along the guide rails on at least two wheel assemblies, a vertical post extending from the carriage base, a vertical slide that moves up and down the vertical post and that can be locked in place, such vertical slide capable of being attached to a cutting instrument such as a chainsaw or a bandsaw sawhead. Optionally, the portable sawmill is adjustable so that a generic ladder can be used as the guide rails. To use the portable sawmill of the present invention, the user places a log parallel to the guide rails, adjusts the height of the vertical slide to achieve the desired depth-of-cut on the log, and moves the carriage base along the guide rail to cut the log longitudinally. The user can then reset the carriage base to the starting position, re-adjust the vertical slide to a different height, and move the carriage base along the guide rail again to make a second cut in the log, such second cut being generally parallel to the first cut, to provide the user with a plank of wood.

An embodiment of the present invention will now be described as shown in FIGS. 1-12. All figures show the present invention fitted with a chainsaw sawhead. The present invention is also suitable for use with a bandsaw sawhead.

FIG. 1 gives a perspective view of a portable sawmill that incorporates features of the present invention. FIG. 1 does not show all of the parts of the sawmill, but rather identifies the sawmill's major components, each of which is further described in FIGS. 2-12. A chainsaw is removably connected to a sawhead support assembly which is in turn connected to a vertical post (104). The sawhead support assembly can be adjusted on the vertical slide (108) in at least one, preferably two axes of rotation. The chainsaw and sawhead support assembly can be moved in a vertical direction along post (104) through the use of vertical slide. The vertical post (104) is affixed to a carriage base (102) which is preferably generally triangular in shape. The carriage base (102) has at least two fixed, wheel assemblies (110) located on opposite ends of one side, and capable of rolling along a guide rail (130). The carriage base (102) is also connected to at least one outrigger assembly (106) at the end of the triangle that opposes the wheel assemblies (110). The outrigger assembly (106) has at least one adjustable outrigger wheel assembly (126) attached thereto. The wheels of the outrigger wheel assembly (126) and the carriage base wheel assemblies (110) roll along a pair of generally parallel guide rails (130), which can be a dedicated guide rail assembly, or a generic multipurpose ladder, such as an aluminum ladder, as shown (128). The portable sawmill also has log support assemblies (100) affixed to the guide rail (such as the ladder 128), which are used for the positioning and handling of the log to be cut (not shown in FIG. 1).

The portable sawmill may also have a push handle (112) affixed to the carriage base (102) for moving the carriage base (102) in a horizontal direction. The portable sawmill may also have track sweepers (114) to clean the guide rails during use, to provide for smooth movement of the carriage base (102) along the track.

The sawmill, if fitted with a chainsaw sawhead (124), may also have a chainsaw guard (120) to protect the user.

The sawmill may also have a lumber scale (122) to facilitate measurement of the depth-of-cut.

The push handle (112) may also have a throttle assembly, connected to the throttle of the sawhead, be it chainsaw or bandsaw to allow for remote control of the engine throttle from the push handle (112).

The major components of the sawmill are further described in FIGS. 2-12.

Figure 2:
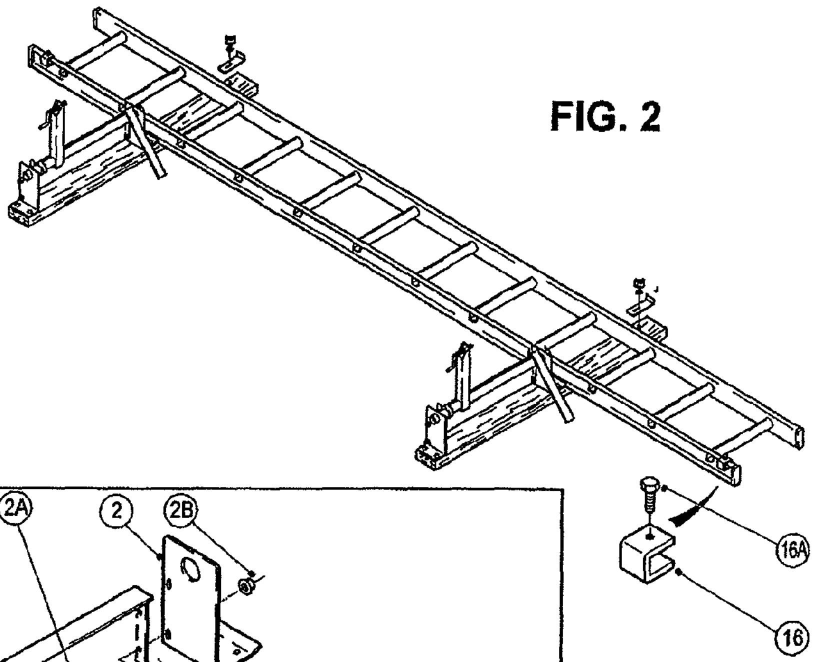
FIG. 2 shows a portion of the sawmill of FIG. 1, namely, the sawmill log dog and log support assembly.
Figure 3:
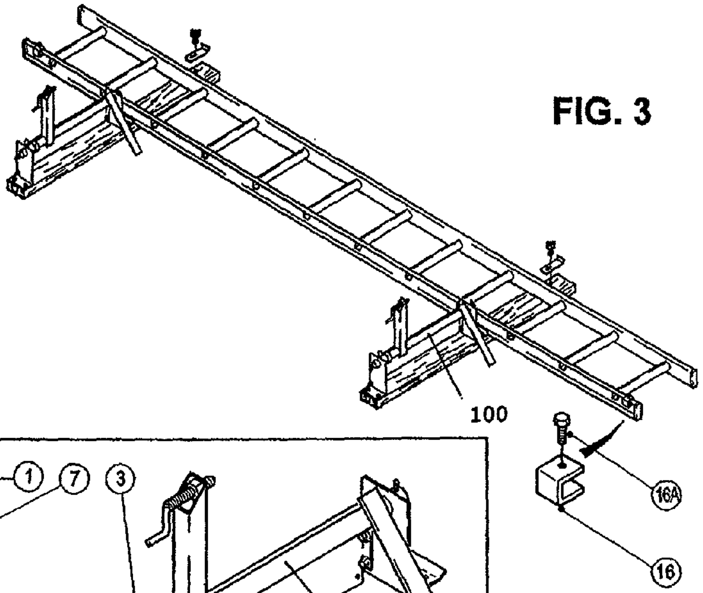
FIG. 3 shows a portion of the sawmill of FIG. 1, namely, the sawmill log dog and log support.
Figure 3A:
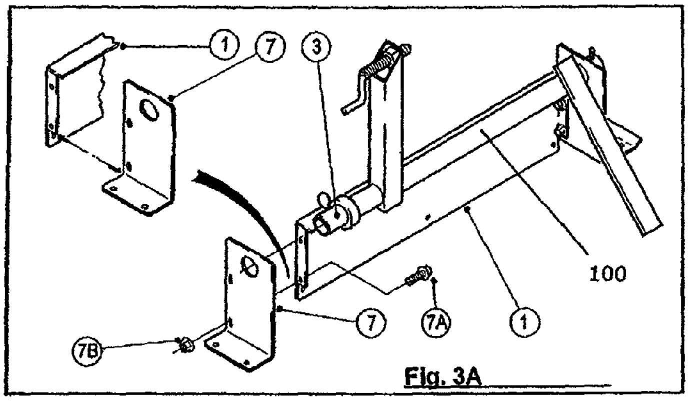
FIGS. 3A, 3B, 3C and 3D show exploded views of portions of FIG. 3.
Figure 3B:
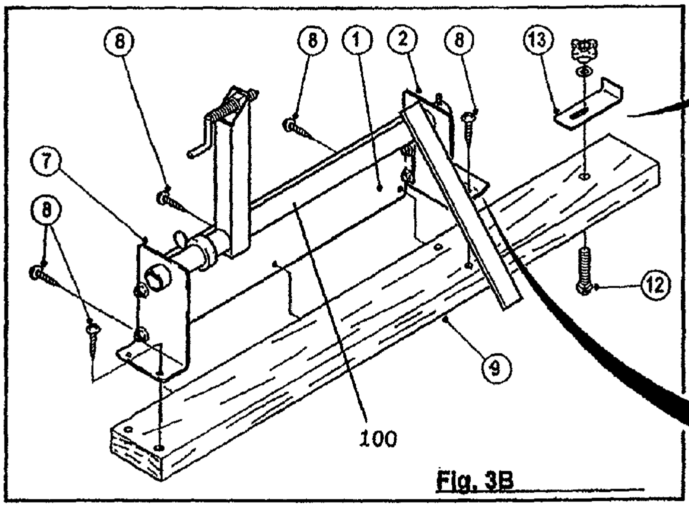
Figure 3C:
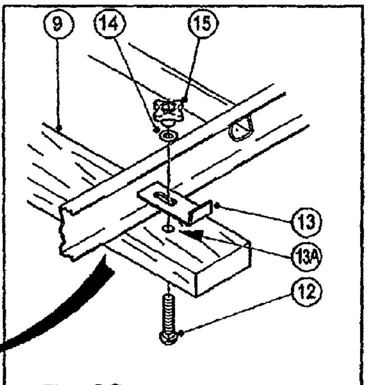
Figure 3D:
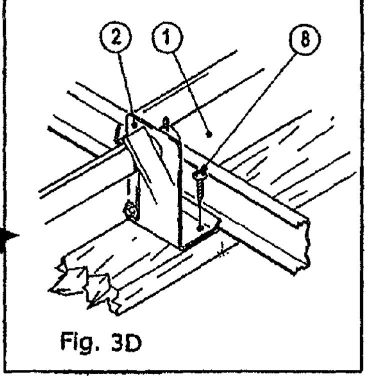

FIGS. 2 and 3 show the log dog and log support assemblies (shown as 100 in FIG. 1). The log dog and log support assemblies may be affixed to, and supported by, boards, planks, or beams, which, in turn, are also affixed to, and support, the guide rails (130), be it a dedicated guide rail assembly or a ladder. The log dog and log support assemblies hold the log (not shown) in place next to and parallel to the ladder (128).

FIG. 2 shows the log dog and log support assemblies affixed next to a ladder (128). A ladder stop (16) affixed by a ladder stop screw (16A) at either end of the ladder (128) ensure the carriage base (102) (not shown in FIG. 2) does not roll off the ends of the ladder when in use.

Figure 2A:
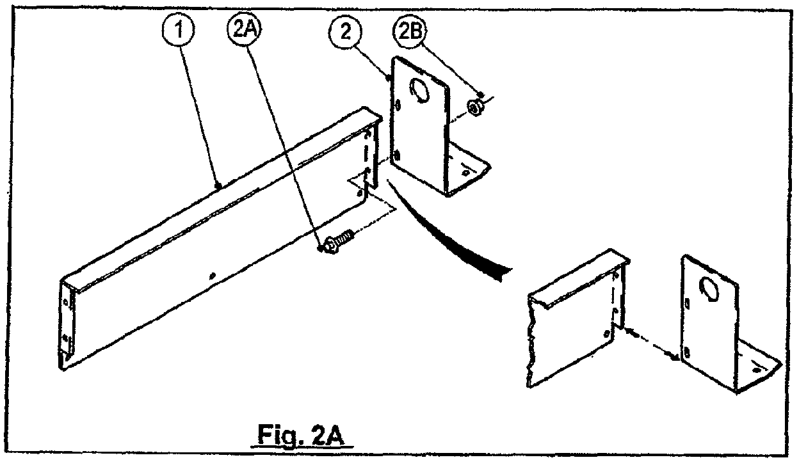
FIGS. 2A and 2B show exploded views of portions of FIG. 2.
Figure 2B:
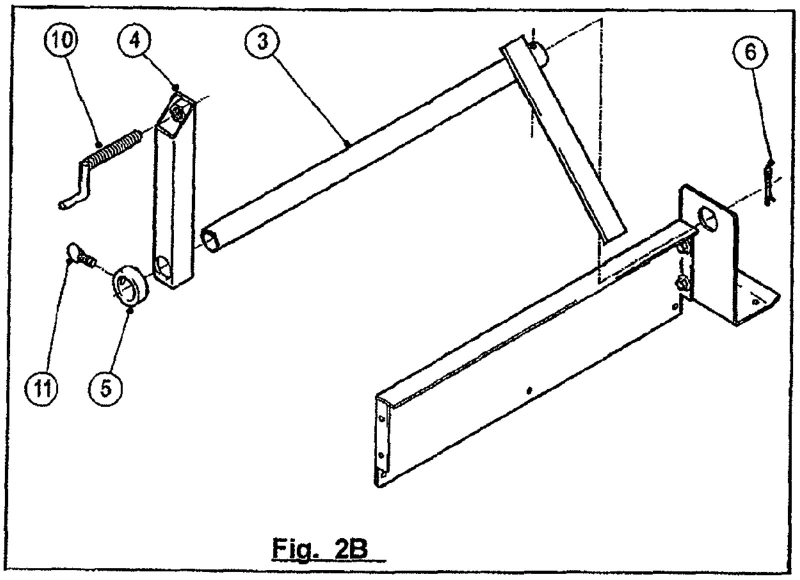

FIGS. 2A and 2B are exploded views of the log dog and log support assembly (100). Cross member (1) is affixed to inner bed support (2) with inner bed support nut and bolt (2A, 2B). One end of the log support bar (3) is passed through a hole in the inner bed support (2) and secured with a support bar cotter pin (6). The log dog brace (4) is installed on the other end of the log support bar (3). Log dog screw (10) screws into log dog (4) and is used to keep the log (not shown) in place, by screwing into or clamping the log.

FIG. 3 shows detail of the outer bed support (7) and the ladder clamp (13). The outer bed support (7) is affixed at the outer end of the log support bar (3) and cross member (1). The log dog and log support assembly are mounted to a log support base (9) using fasteners (8). The log support base (9) also supports the guide rails (128), which are affixed between the inner bed supports (2) and ladder clamps (13). Each ladder clamp (13) is adjustably held in place utilizing carriage bolt (12), washer (14) and hand knob (15).

Figure 4:
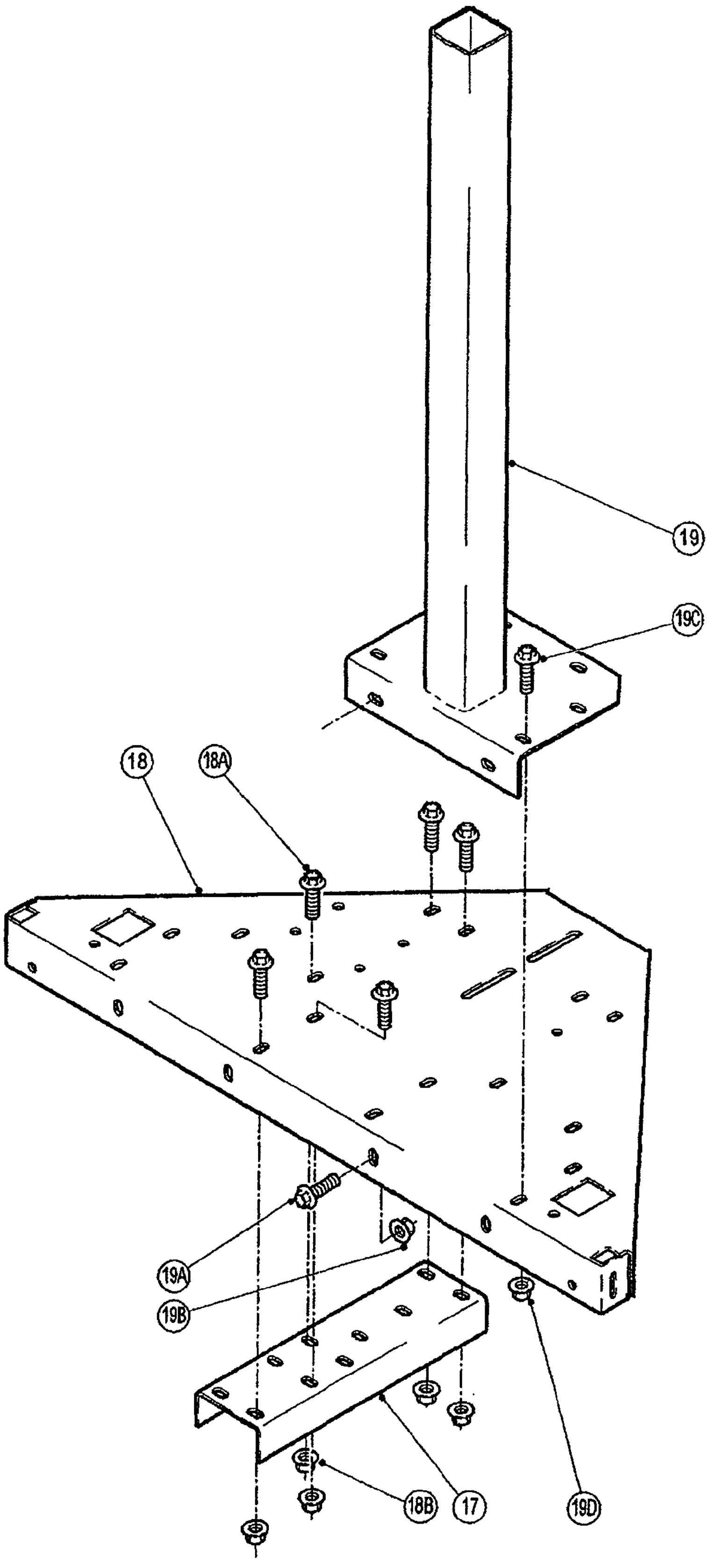
FIG. 4 shows a portion of the sawmill of FIG. 1, namely, an exploded view of the carriage base and vertical post assembly.

FIG. 4 is an exploded view of the carriage base and vertical post assembly. The carriage base (102 or 18), which can be generally triangular in shape, is affixed to the vertical post (19) using nuts and bolts (19A, 19B, 19C, 19D). A base stiffener (17) can optionally be used to provide added structural integrity to the carriage base (18). As shown, the base stiffener (17) is attached to the underside of the carriage base (18) using nuts and bolts (18A, 18B).

Figure 5:
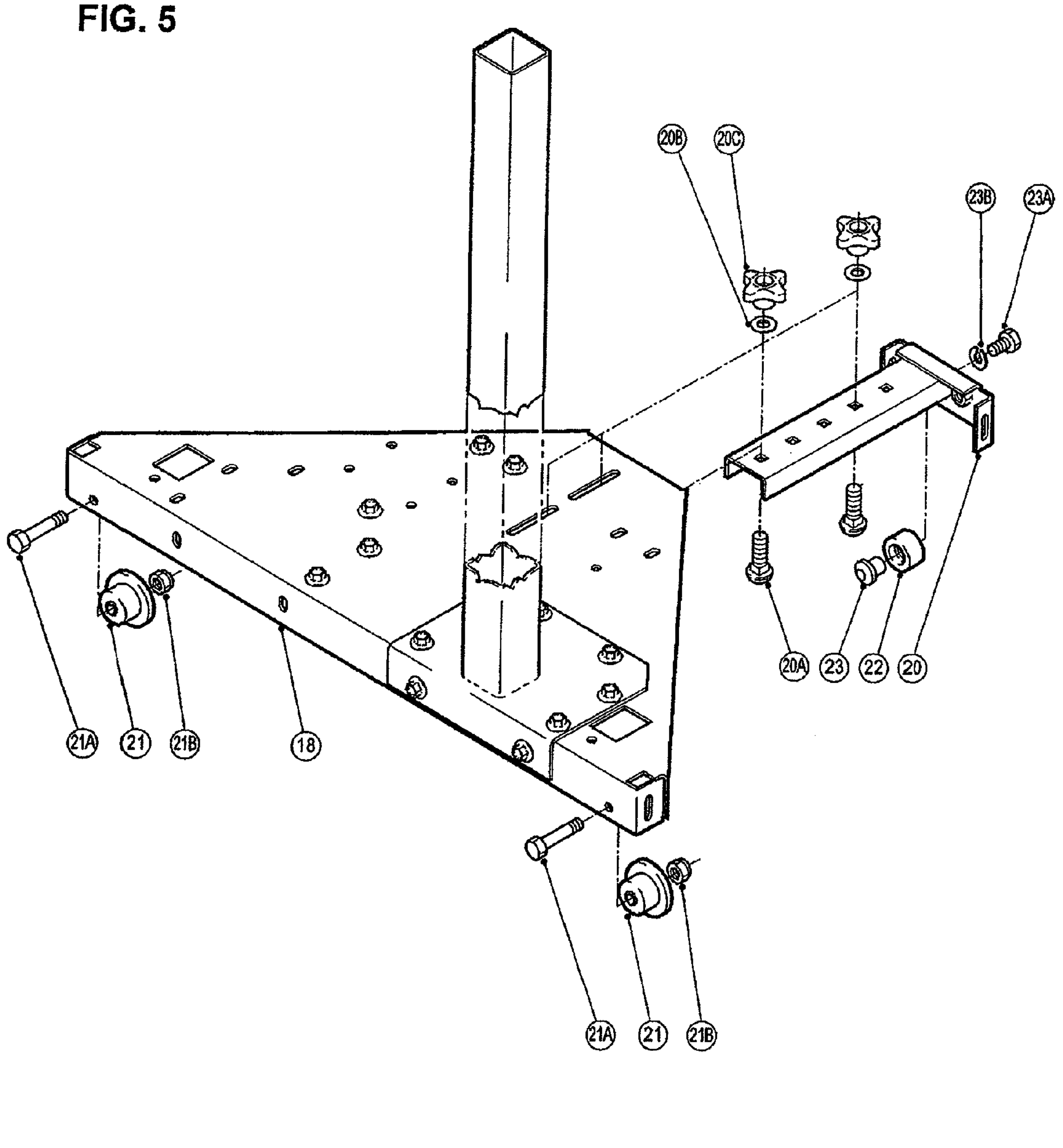
FIG. 5 shows a portion of the sawmill of FIG. 1, namely, an exploded view of the carriage base and vertical post assembly showing the upper wheels of the outrigger arm and the carriage base wheel assemblies.
Figure 7:
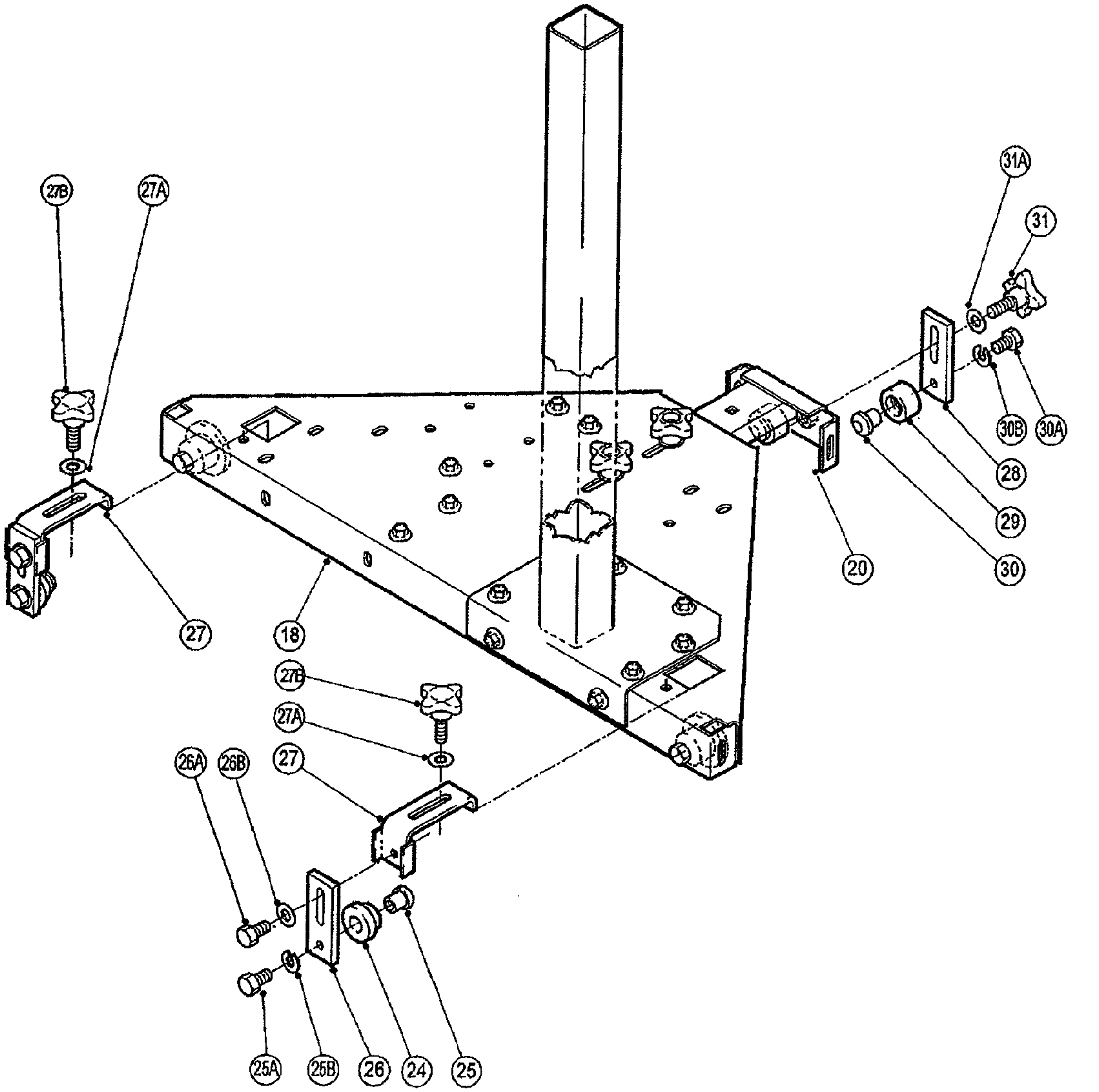
FIG. 7 shows a portion of the sawmill of FIG. 1, namely, an exploded view of the carriage base and outrigger assembly showing the full wheel assemblies of both the carriage base and the outrigger arm.

FIGS. 5 and 7 show exploded views of the carriage base wheel assembly, outrigger wheel assemblies, and the outrigger. Large flanged wheels (21) are fixed, and designed to ride on and abut against the inside upper lip of a horizontal guide rail, such as the ladder (128). The inner fixed flanged wheels (21) are attached to the base (18) with nuts and bolts (21A, 21B). An outrigger fixed balance wheel (22) is affixed to an outrigger arm (20) with an outrigger fixed balance wheel nut, bolt and washer (23, 23A, 23B). The outrigger fixed balance wheel (22) is designed to ride on an upper plane of a horizontal guide rail such as one length of a ladder (128). The outrigger (20) is affixed to the carriage base (18) using outrigger nuts, washers, and hand knobs (20A, 20B, 20C). The outrigger is adjustable to accommodate guide rail assemblies or ladders of different widths.

The outrigger arm (20) also has a movable balance wheel (29) that can be adjusted by the user to ride on the lower plane of a guide rail such as the ladder (128). The movable balance wheel (29) is affixed to an outrigger movable balance wheel holder (28) using an outrigger movable balance wheel nut, bolt and washer (30, 30A, 30B). The outrigger movable balance wheel holder (28) is, in turn, adjustably affixed to the outrigger arm (20) using outrigger movable balance wheel holder knob and washer (31, 31A). The outrigger movable balance wheel holder (28) can be moved in a vertical direction relative to the outrigger arm (20), to allow for guide rails (130) of varying thicknesses to be used, as well as to facilitate the installation of the outrigger arm (20) onto the guide rail (130). Operation of the thumb screw (31) allows for the quick-connect and quick-disconnect of the movable balance wheel holder (28) and outrigger movable balance wheel (29). The outrigger fixed balance wheel (22) rides on the top plane of the guide rail (130), and the outrigger movable balance wheel (29) can ride on the lower plane of the guide rail (130).

Outer flanged wheels (24) are affixed to vertical outer wheel holders (26) by way of nut, bolt and washer (25, 25A and 25B). The vertical outer wheel holders (26) are adjustably mounted to horizontal outer wheel holders (27) by way of washers and bolts (26A, 26B). Each outer wheel holder assembly is in turn adjustably affixed to the carriage base (18) by means a hand knob and washer (27B, 27A). Like the outrigger movable balance wheel holder (28), the vertical outer wheel holders (27) can be moved in a vertical direction relative to the horizontal outer wheel holders (26), and the inner wheel holder (26) can be moved in a horizontal direction relative to the carriage base (18), such adjustments allowing for guide rails (130) of varying thicknesses to be used, as well as to facilitate the installation of the carriage base (18) onto the guide rail (130) such that the inner fixed flanged wheels (21) can ride on and abut against the inner upper lip of the guide rail (130), while the outer flanged wheels (24) are able to ride on the lower plane of the guiderail (130).

The distance between outrigger fixed balance wheel (22) and the inner fixed flanged wheels (21) can be adjusted by moving the outrigger arm (20) horizontally relative to the base (18), adjusting the outrigger movable balance wheel holder (28) relative to the outrigger arm (20), and then tightening outrigger hand knobs (20C) to lock the outrigger arm (20) in place, and outrigger movable balance wheel holder knob (31) to lock the outrigger movable balance wheel holder (28) in place.

In addition, the outer flanged wheels (24) position can be adjusted horizontally and vertically by moving the horizontal outer wheel holders (27) relative to carriage base (18) and vertical outer wheel holders (26) relative to inner wheel holder (27) respectively. These adjustments allow guide rails of different dimensions to be used, for example, different widths and "thicknesses" of ladders (128). The adjustments also allow for the securing of the base and outrigger assembly onto the guide rail (130) so that the carriage base (18) can move neither laterally nor vertically, but can only move horizontally along the guide rail (130).

Both the outrigger (20), horizontal outer and the wheel holders (27) and the outrigger movable balance wheel holder (28) can be designed to be "quick connect/disconnect" so that a user can quickly separate the carriage base (18) from the guide rails (130) (as ladder (128)).

The guide rails (130) can be supplied by the manufacturer and specifically designed for the portable sawmill, or optionally (and as shown), the user of the sawmill can use a generic ladder, such as an aluminum multi-purpose ladder (128) as guide rails (130).

Figure 6:
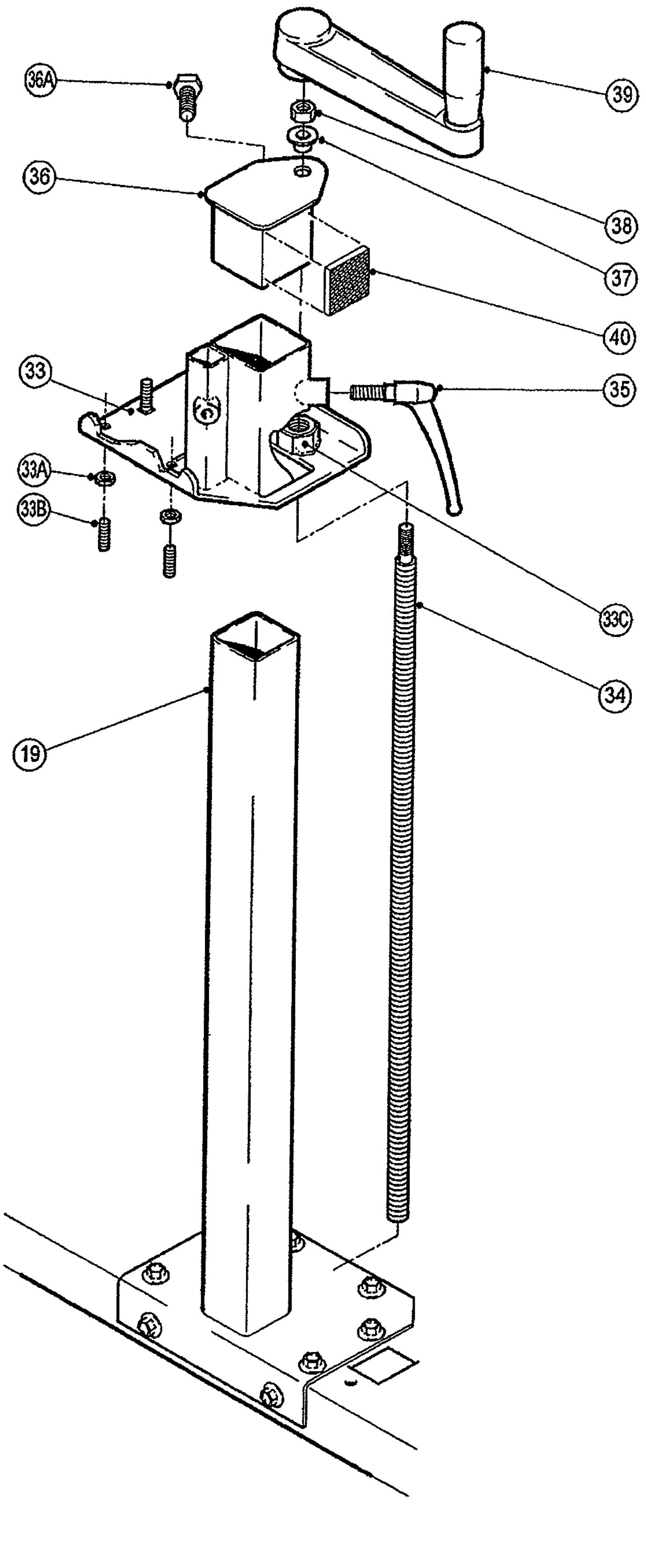
FIG. 6 shows a portion of the sawmill of FIG. 1, namely, an exploded view of the vertical post and vertical slide.

FIG. 6 shows an exploded view of the vertical slide (33). The sawmill features close contact sleeve construction to couple the vertical slide (33) with the post (19) to facilitate vertical sliding movement without the need for intermediate friction-reducing mechanisms such as bearings, bushings or the like. The vertical slide (33) allows for lateral displacement of the sawhead support (56) (not shown in FIG. 6) is mounted to vertical slide (33), and, as a result, the sawhead (124), relative to the post (19). The vertical slide (33) can be displaced vertically by means of a crank handle (39). The crank handle (39) is affixed to the post top (36), which is, in turn, frictionally mounted to the top of the post (19), and secured with post top bolt (36A). Crank handle (39) is functionally connected to lift screw (34), which threads through lift screw nut (33C) on the vertical slide (33). Post top bushing (37) and post top nut (38) fasten the crank handle (39) to the lift screw (34) through the post top (36). Turning the crank handle (39) thus turns the lift screw (34), causing vertical slide (33) to move up and down along the post (19). Vertical slide locking handle (35), screwed into the vertical slide (33), allows for the locking of vertical motion of the vertical slide (33) along the post (19) by frictionally engaging the post (19) when turned. Post top (36) prevents the movement of vertical slide (33) beyond the top of post (19).

Figure 10:
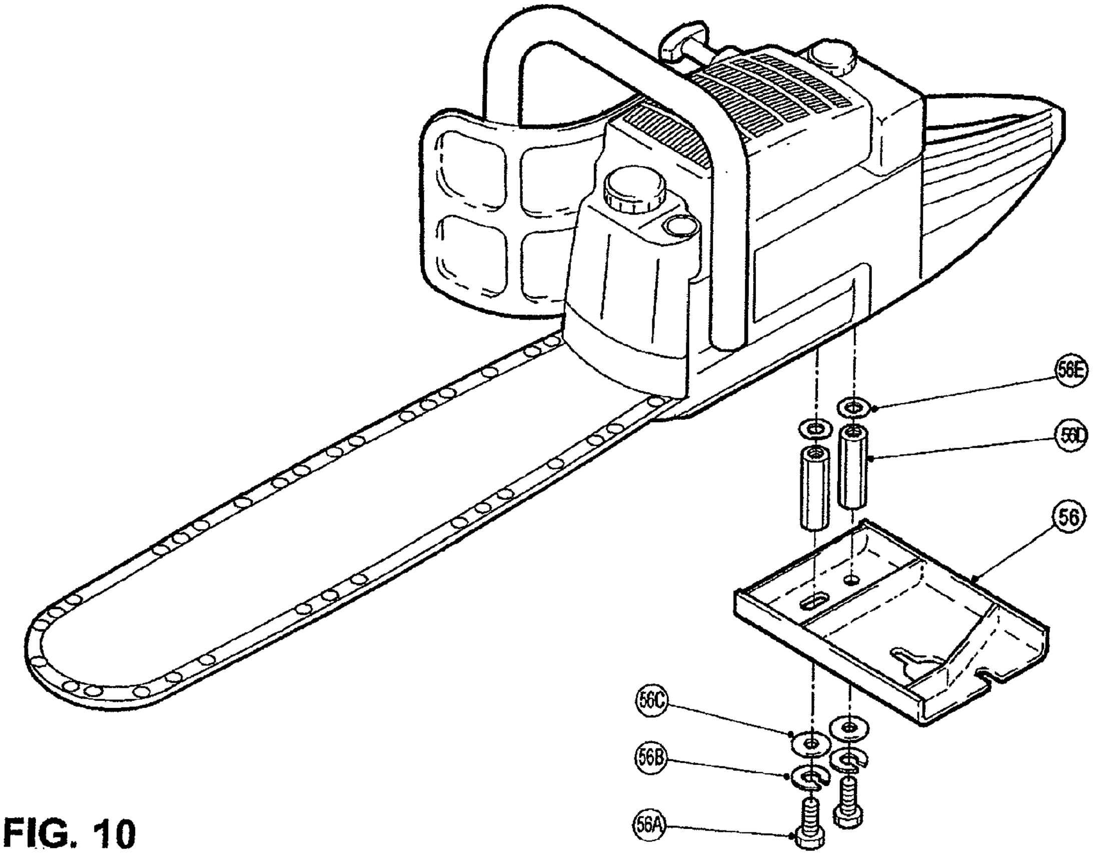
FIG. 10 shows a portion of the sawmill of FIG. 1, namely, the chainsaw support assembly.
Figure 12:
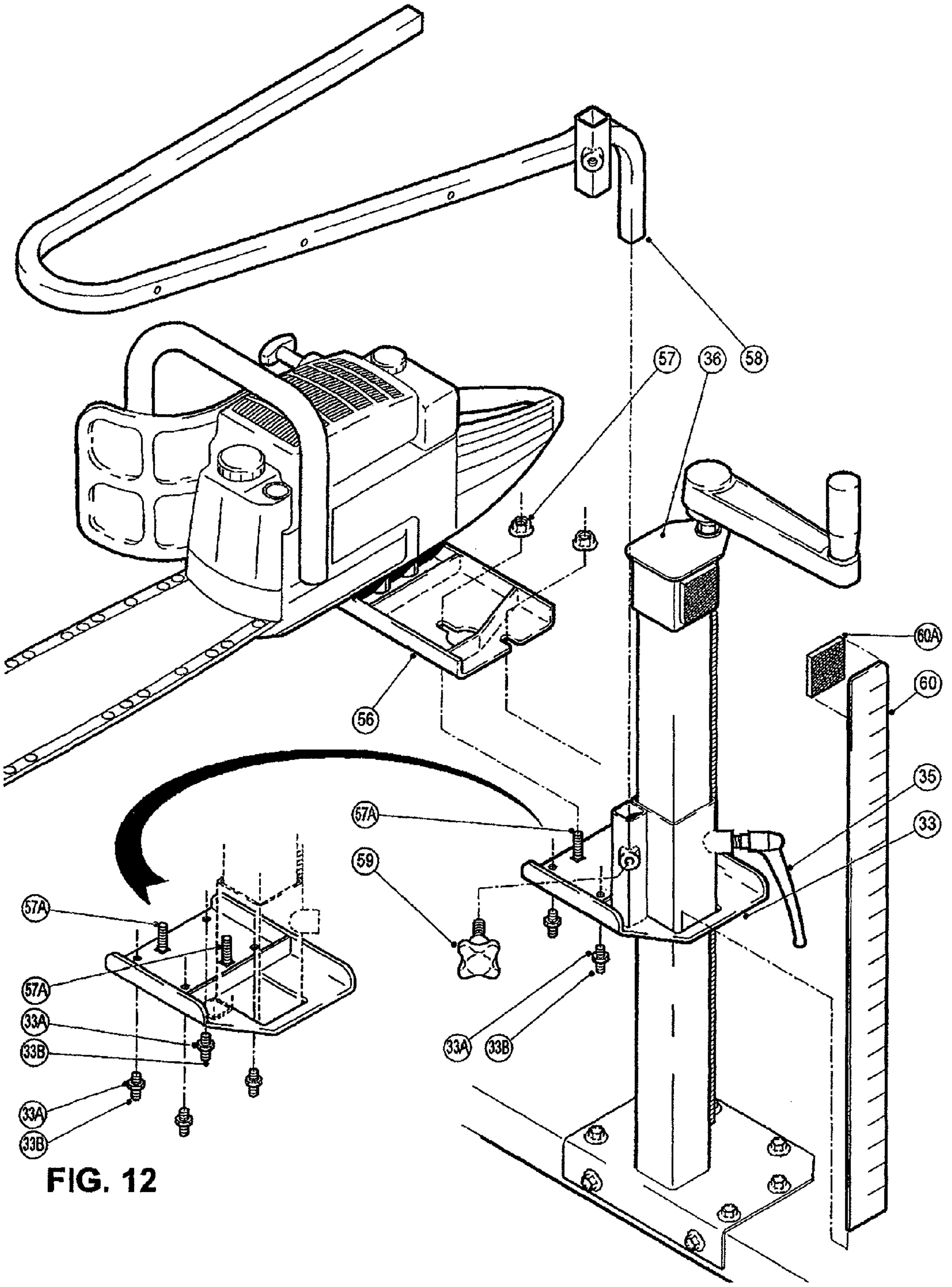
FIG. 12 shows a portion of the sawmill of FIG. 1, namely, the chainsaw, chainsaw guard and lumber scale assembly.

FIG. 10 shows an exploded view of the sawhead support assembly (118) assembled on a chainsaw (118). FIG. 12 shows how the sawhead support assembly (118) affixes to the vertical slide (33). The sawhead support (56) affixes to the chainsaw or bandsaw sawhead (J) through bolts, lock washers, washers, and screw nuts (56A-E) (shown in FIG. 10). The sawhead support (56) can be affixed to the vertical slide (33) by a quick-connect/disconnect mechanism such as one or more bolts and nuts (57 and 57A). In this manner, the sawhead (118) can be connected or disconnected from the sawmill quickly to facilitate handling and transport. The vertical slide (33) also contains at least one or more, but preferably four, sawhead support adjusting bolts (33A) and sawhead support adjusting nuts (33B) to allow for quick and accurate adjustment of the sawhead pitch and plane relative to the vertical slide (33), and to allow the user of the sawmill to level the sawhead horizontally. Note that once the desired adjustment is made to sawhead support adjusting bolts (33A), the sawhead (124), through the sawhead support (56), can normally be removed and re-affixed to the vertical slide (33) without needing readjustment of pitch and plane.

FIG. 12 also shows chainsaw sawhead guard (58), mounted onto vertical slide (33) through the use of chainsaw guard hand knob (59). The chainsaw sawhead guard (58) helps protect the user from accidentally touching the chainsaw bar (118) while in use. Also shown is lumber scale (60), which is mounted to the vertical post (19) using lumber scale velcro (60A) and post top velcro (40) (shown in FIG. 6). The lumber scale (60) allows the user to accurately set the height of the vertical slide (33) and sawhead, thus permitting him to set the depth of the cut to achieve his desired board measurements.

Figure 8:
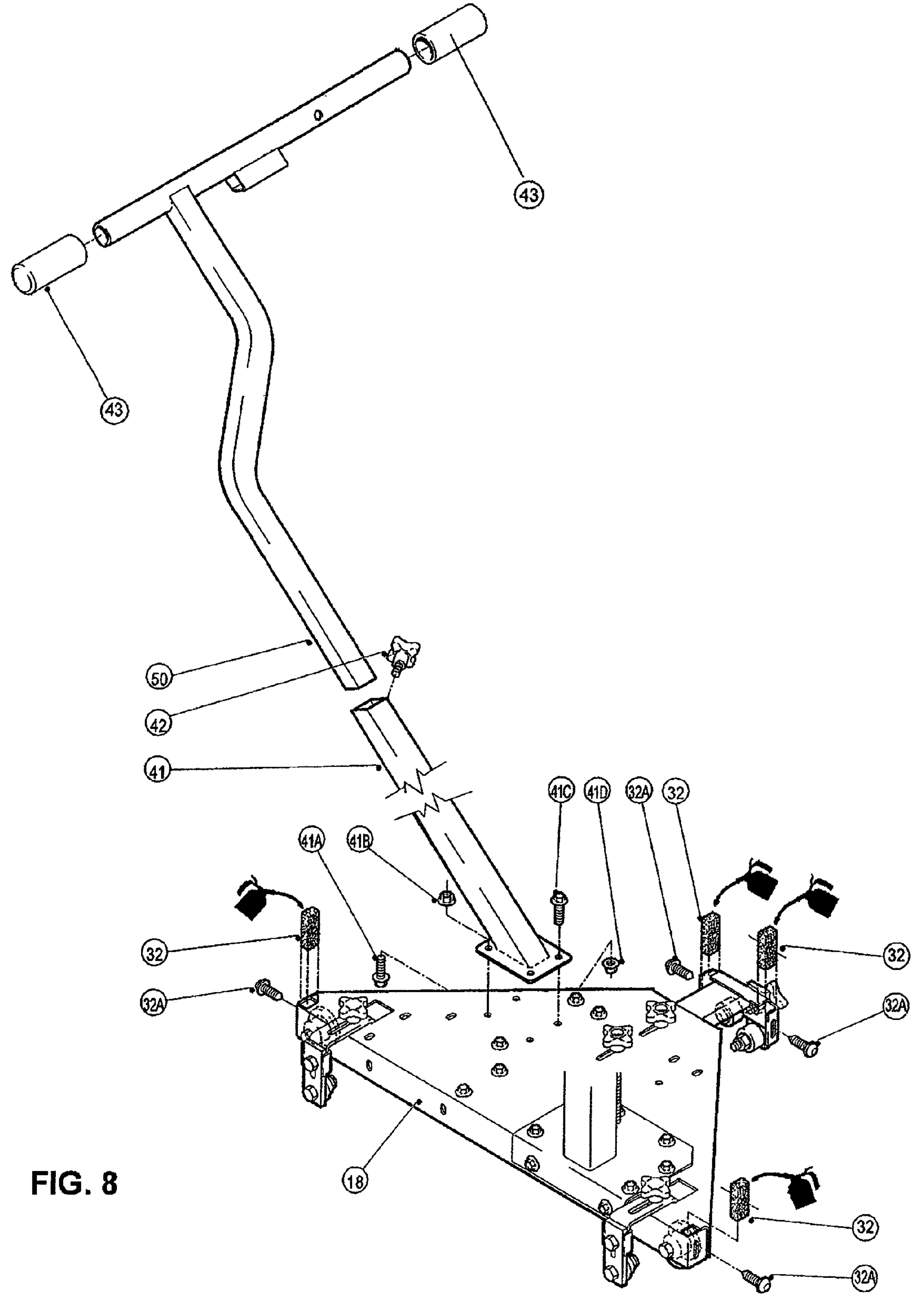
FIG. 8 shows a portion of the sawmill of FIG. 1, namely, an exploded view of the push handle and track sweepers.

FIG. 8 shows the push handle (112) and track sweeper assemblies (114). Track sweepers (32) are felt pads affixed to the outrigger arm (20) and the carriage base (18) by track sweeper bolts (32A). The track sweepers (32) are located in line with the inner fixed flanged wheels (21) and the outrigger fixed balance wheel (22). Track sweepers (32) are typically saturated in oil by the user and act to clean and lubricate the guiderails (130) while the sawmill is in use, by rubbing against the guide rails (130) as the carriage base (18) is moved along the guide rails (130).

The sawmill may also have a push handle (50), connected to the carriage base (18) (shown here connected through push handle receiver (41)), that permits the user to easily, comfortably and conveniently push the carriage base (18) and the sawhead horizontally along the guide rails. The push handle (50) is shown here attached through the carriage base (18), but it may also be connected to the sawhead support (56), the vertical slide (33), or directly to the sawhead itself. As shown, push handle receiver (41) is affixed to the carriage base (18) using push handle receiver bolts and nuts (41A-D). Push handle receiver (41) is adapted to receive push handle (50), which can be adjustably locked in place using push handle receiver hand knob (42). Push handle grips (43) are frictionally engaged on the ends of push handle (50) to provide better grip for the user. The push handle (50) can thus be easily and quickly assembled and disassembled from the push handle receiver (41) for compact storage and transport. The push handle (50) facilitates use of the sawmill by allowing the user to stand away from the sawhead, and transfers horizontal movement from the user through to the carriage base (18) to allow the lateral movement of the carriage base (18) along the guiderails. The push handle (50) is adjustable to accommodate operators of different heights, by adjusting the push handle (50) in and out of the push handle receiver (41), then frictionally locking it in place with the push handle receiver hand knob (42). The push handle (50) can easily be attached and removed from the push handle receiver (41) for quick assembly and disassembly, and for compactness when transporting the disassembled sawmill.

Figure 9:
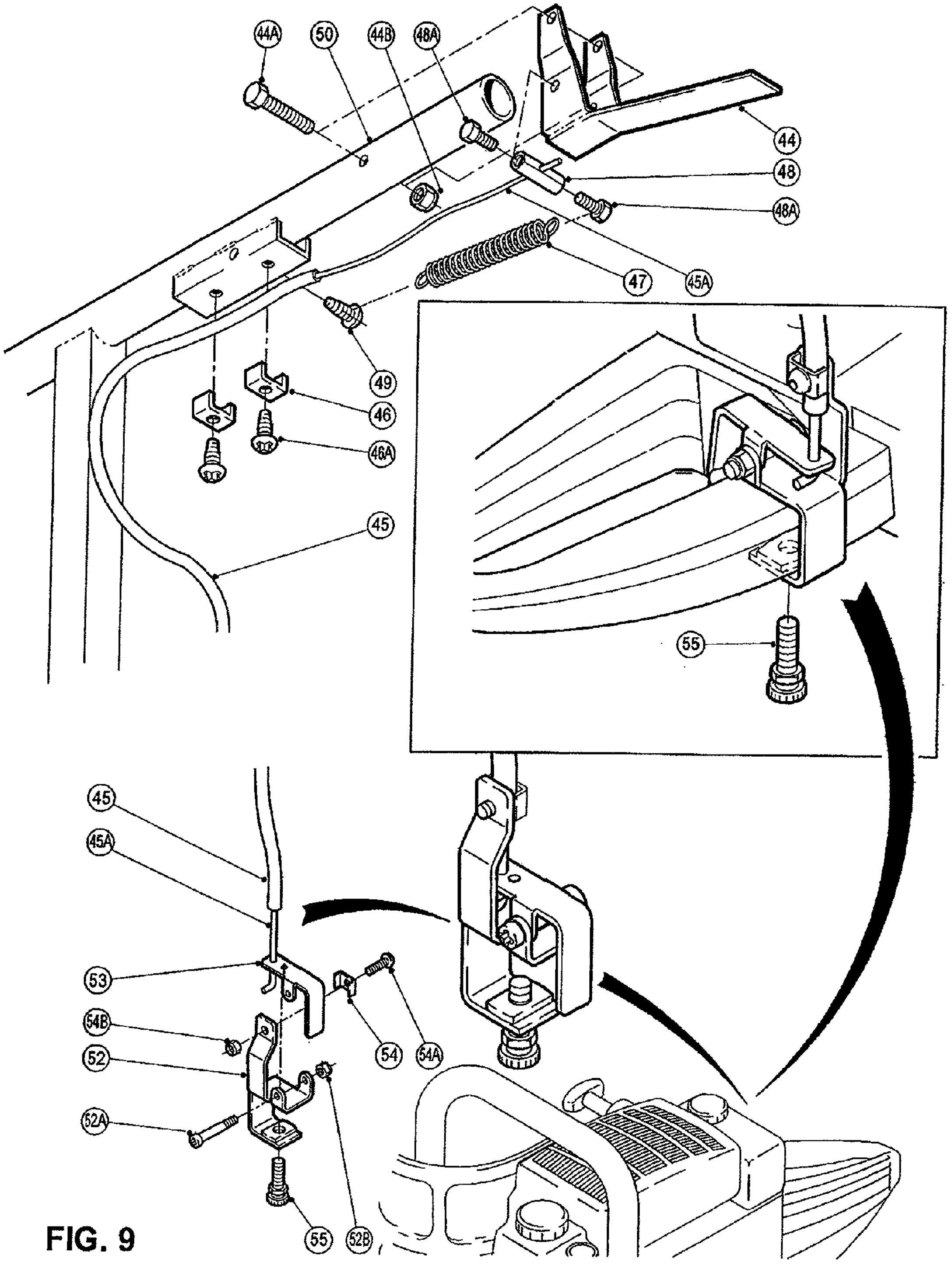
FIG. 9 shows a portion of the sawmill of FIG. 1, namely, an exploded view of the throttle assembly.

Shown in FIG. 9, the push handle (50) comprises a throttle assembly (116), operatively connected to the sawhead engine, which allows the operator to remotely, easily and conveniently control the chainsaw (124) engine throttle.

In the case of a chainsaw sawhead, the throttle assembly (116) comprises a throttle actuator assembly (comprising a fixed throttle actuator (52) and a movable throttle actuator (53)) which is operably and removably affixed to the throttle of the sawhead, through the use of throttle actuator coupling nut (55), movable throttle actuator bolt (54A) and movable throttle actuator nut (54B). Fixed throttle actuator bolt (52A) and fixed throttle actuator nut (52B) provide a pivot point around which the fixed throttle actuator may rotate to depress and reversably release the throttle of the sawhead. The movable throttle actuator (53) can be moved in relation to the fixed throttle actuator (54) to actuate the chainsaw throttle (not shown). The movable throttle actuator (53) is affixed to a throttle inner wire (45A), which is itself cased in a throttle exterior cable casing (45). In the case of a bandsaw sawhead (not shown), the throttle inner wire (45A) is affixed directly to the engine's throttle lever. The inner wire (45A) is itself cased in a throttle exterior casing (45).

In the case of either sawhead, the throttle exterior cable casing is in turn affixed to the push handle (50) using throttle cable clamps (46) and throttle cable clamp bolts (46A). The throttle wire (45) is secured to throttle handle (44) which is rotatable around throttle handle bolt (44A) at throttle coupling nut (48), via throttle coupling bolt (48A). The throttle exterior cable casing (45) runs the length of the push handle (50) to a throttle handle (44) affixed to the distal end of the push handle (50) by means of throttle handle bolt and nut (44A and B). The throttle handle (44) can be squeezed by a user towards the push handle (50) and is biased away from the push handle (50) through the use of throttle return spring (47). Return spring (47) is affixed to a distal point on the push handle (50) by means of screw (49), and affixed to the throttle handle by means of throttle coupling nut (48A). Squeezing the throttle handle (44) towards the push handle (50) displaces throttle inner wire (45A) which is affixed to the throttle handle (44) with a coupler nut (48) and fasteners (48B). This, in turn, displaces the movable throttle actuator (53) in relation to the fixed throttle actuator (52). The fixed throttle actuator (52) is clamped to the chainsaw in such a way that this displacement of the movable throttle actuator (53) causes displacement of the chainsaw throttle (not shown), resulting in the ability to control the chainsaw speed through the squeezing of the throttle handle (44). In the case of a bandsaw sawhead, squeezing the throttle handle (44) towards the push handle (50) displaces the throttle inner wire (45A), which, in turn, controls the engine throttle. The throttle assembly (116) also quickly disconnects from the sawhead and the push handle (50) in a single cluster, and optionally disconnects from the sawhead without disconnection from the push handle (50) for rapid assembly/disassembly of the sawmill.

Figure 13:
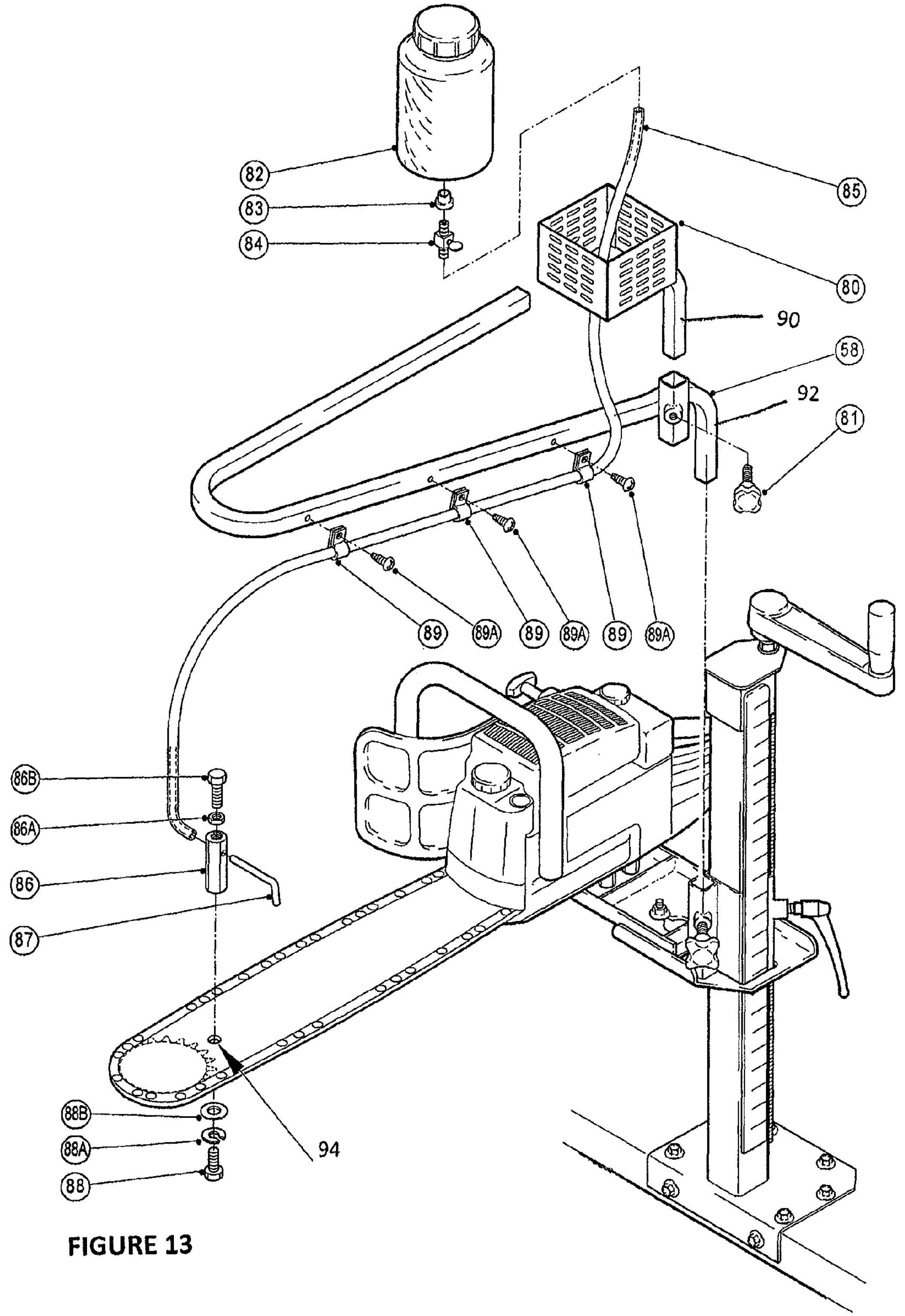
FIG. 13 shows an exploded view of an optional saw bar lubrication system of the present invention.

As shown in FIG. 13, the invention optionally provides a lubrication system. A lubricant case (80) is configured to hold a lubricant bottle (82), which contains an industrial grade lubricant. At the bottom of the lubricant bottle (82), a bottle tap (83) punctures the base of the bottle. The bottle tap is connected to a tap valve (84), which in turn is connected to tube (85). Tube (85) extends along the chainsaw guard and is affixed thereto by tube clip (89) and tube clip screw (89A). At its distal end, tube (85) is connected to a faucet (87) for distributing the lubricant onto the blade of the chainsaw and hence to the chain. Faucet (87) is held in place by means of faucet collar (86), which is secured using faucet nut (86A) and faucet bolt (86B), as well as lower faucet bolt (88), faucet lock washer (88A) and faucet washer (88B). The lubricant case (80) is attached to chainsaw guard (58) by means of a lubricant case support (90), which is releasably inserted into lubricant case support holder (92) on chainsaw guard (58). A support thumb screw (81) is used to releasably secure lubricant case support (90) to lubricant case support holder (92).

Figure 11:
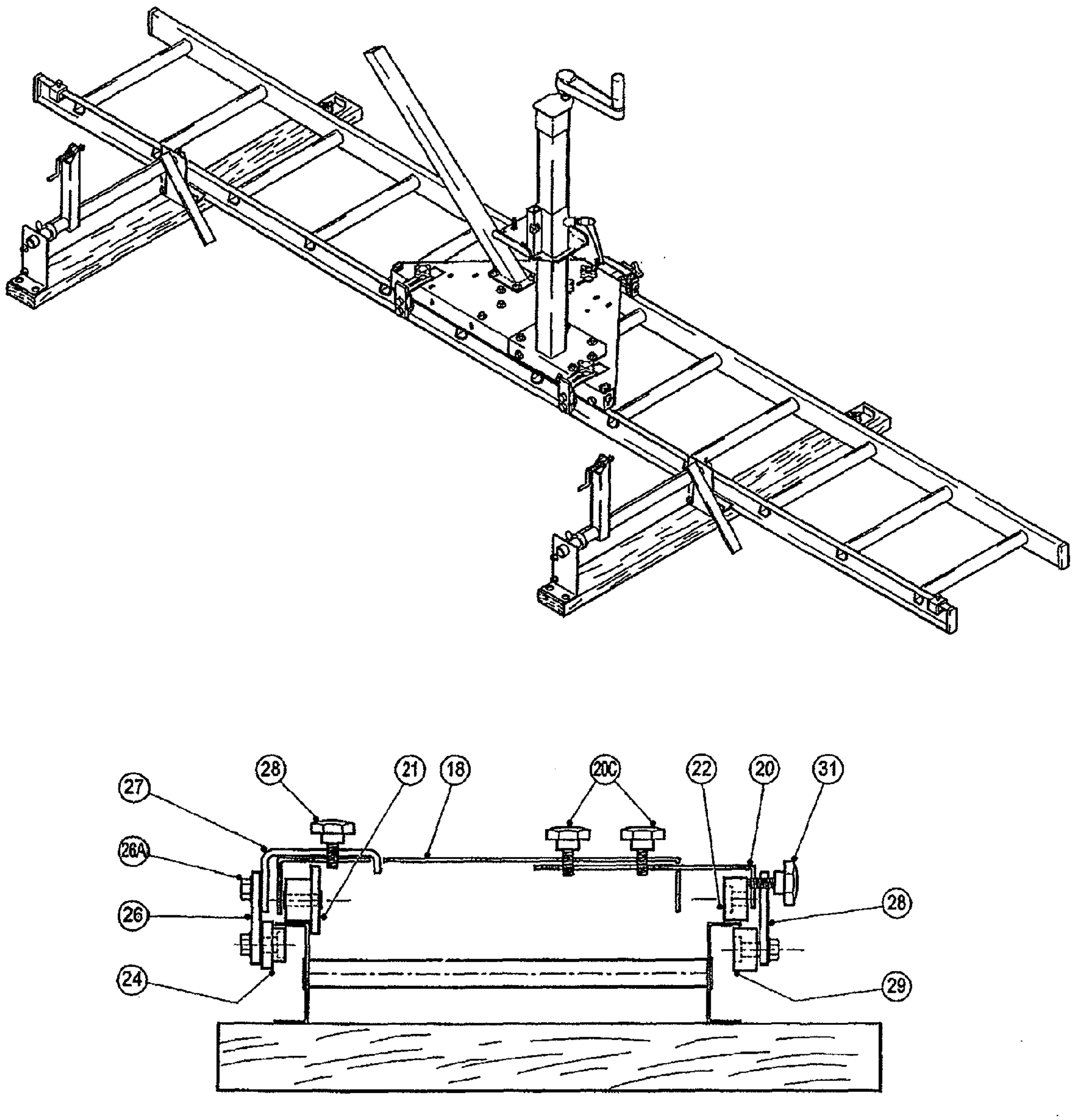
FIG. 11 shows a portion of the sawmill of FIG. 1, namely, the wheel and guide rail alignment.

FIG. 11 shows the assembled sawmill, minus the sawhead and the push handle (50). FIG. 11A shows an end view of the carriage base (18) affixed to the guiderails (in this case, a ladder (128)), and shows the desired wheel alignment for the inner fixed flanged wheels (21), outrigger fixed balance wheel (22), outrigger movable balance wheel (29), and outer flanged wheels (24).

Figure 14:
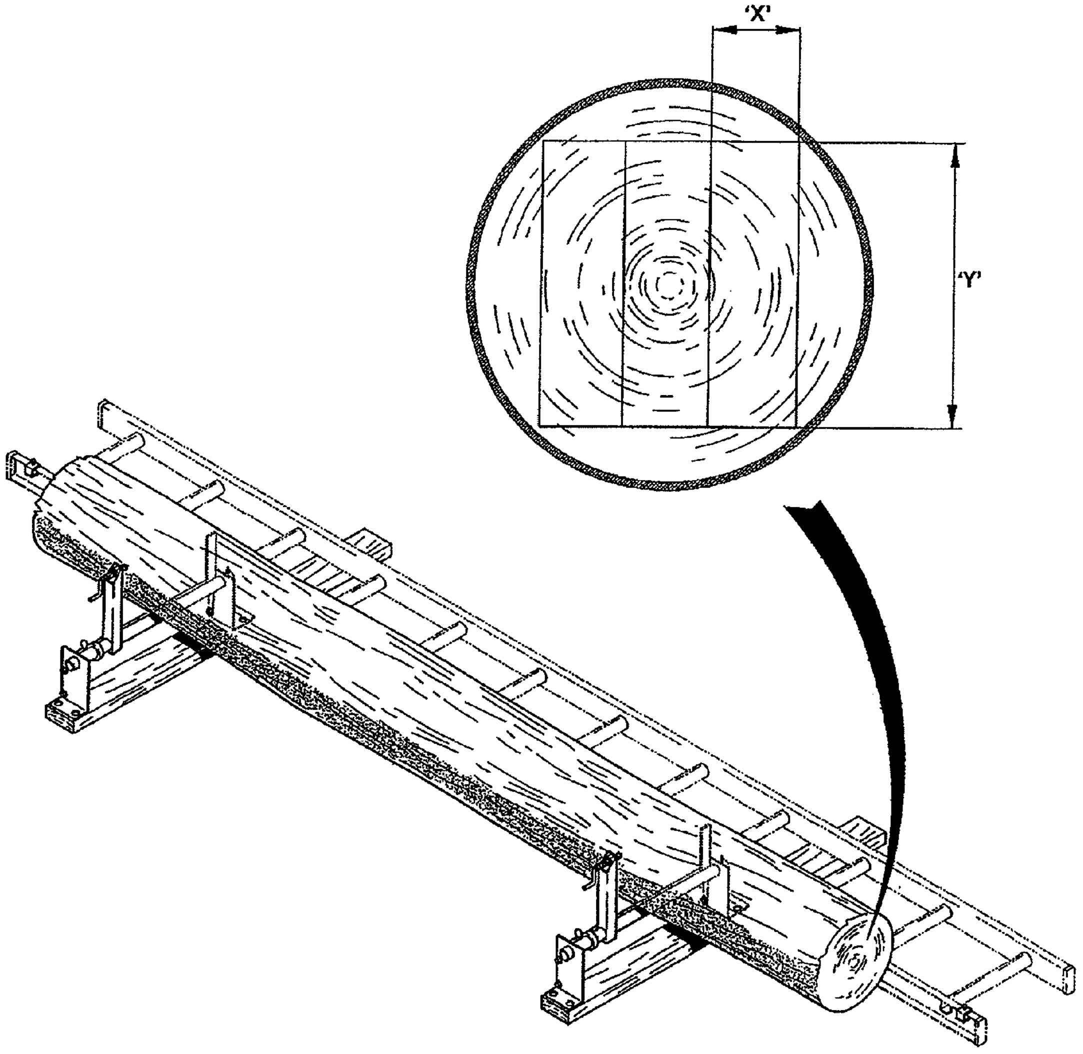
FIGS. 14-20 show the sawmill of FIG. 1 in operation.
Figure 15:
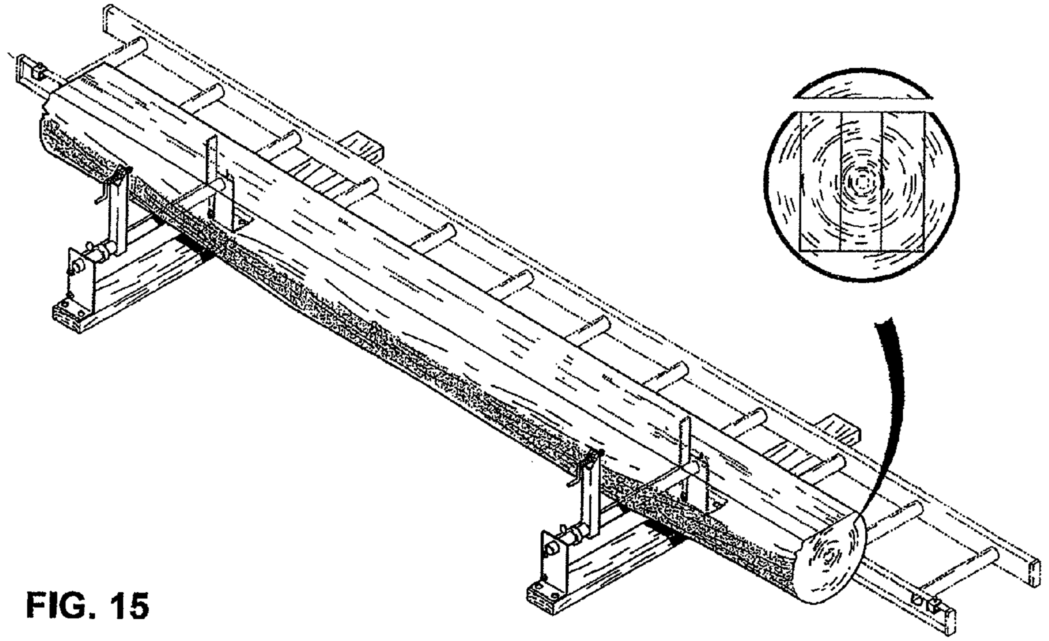
Figure 16:
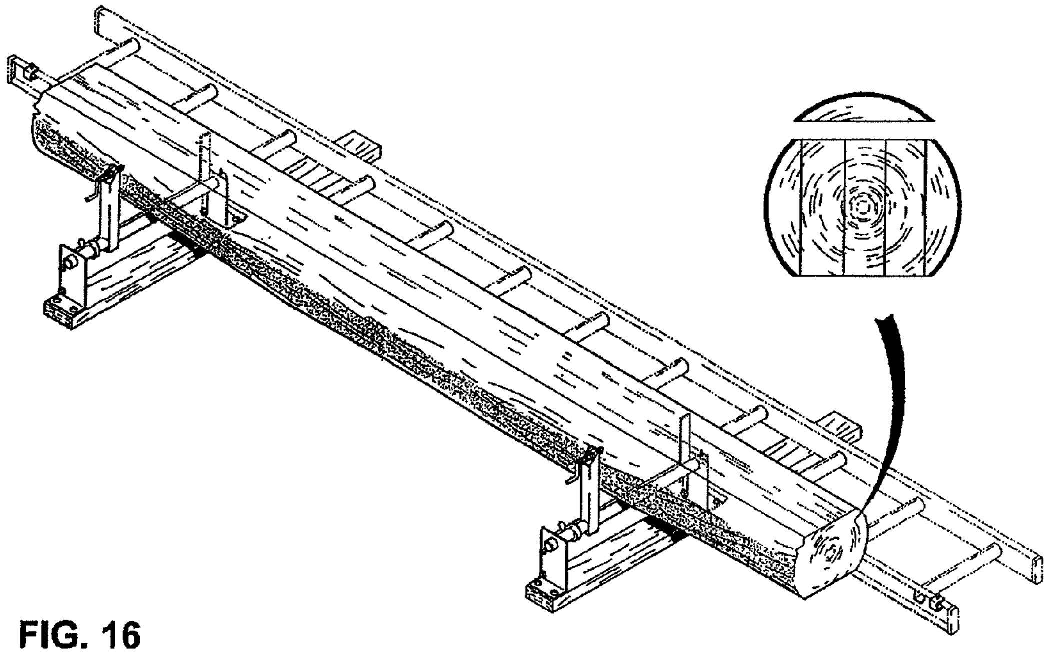
Figure 17:
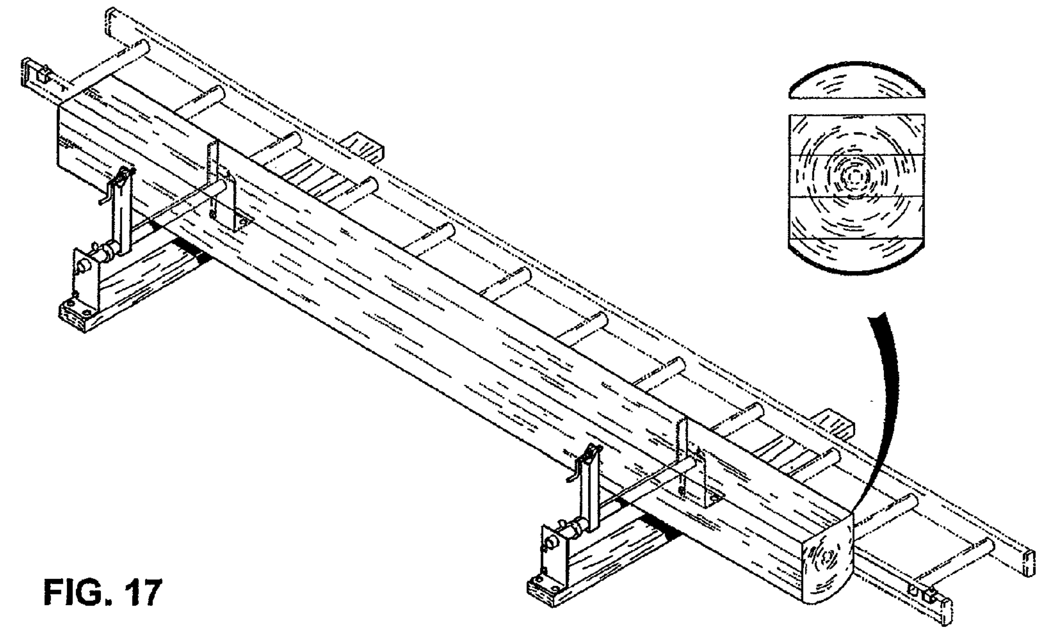
Figure 18:
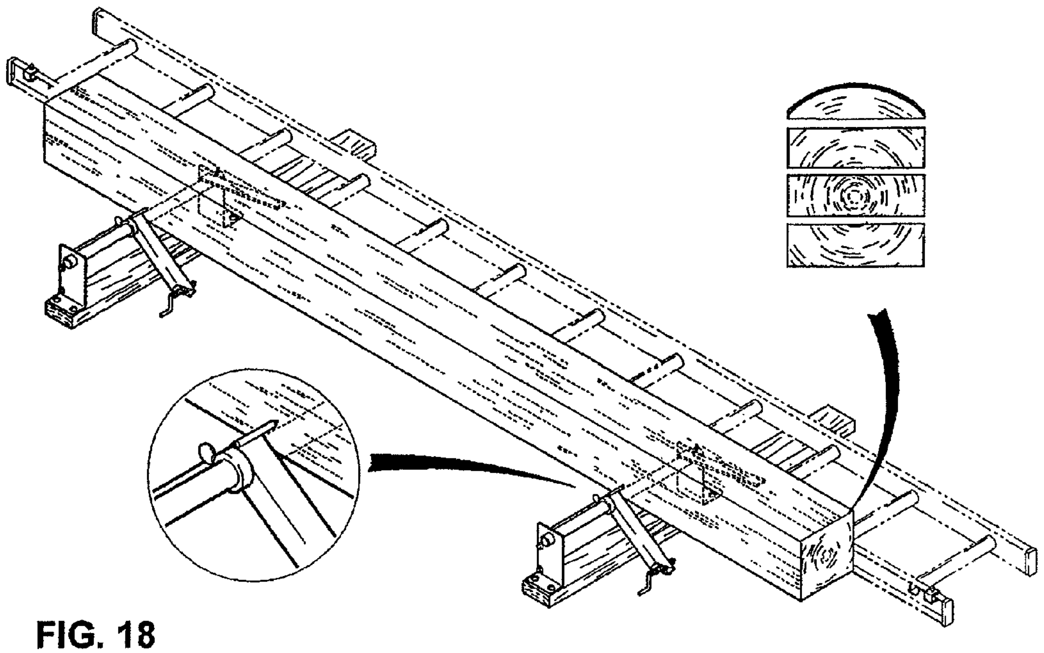
Figure 19:
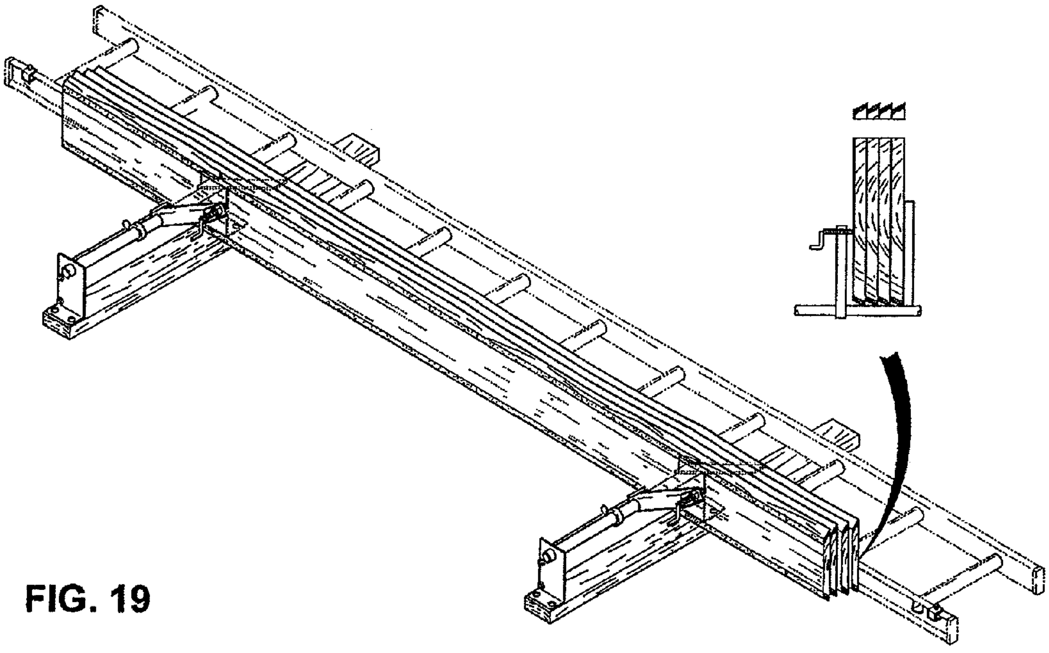
Figure 20:
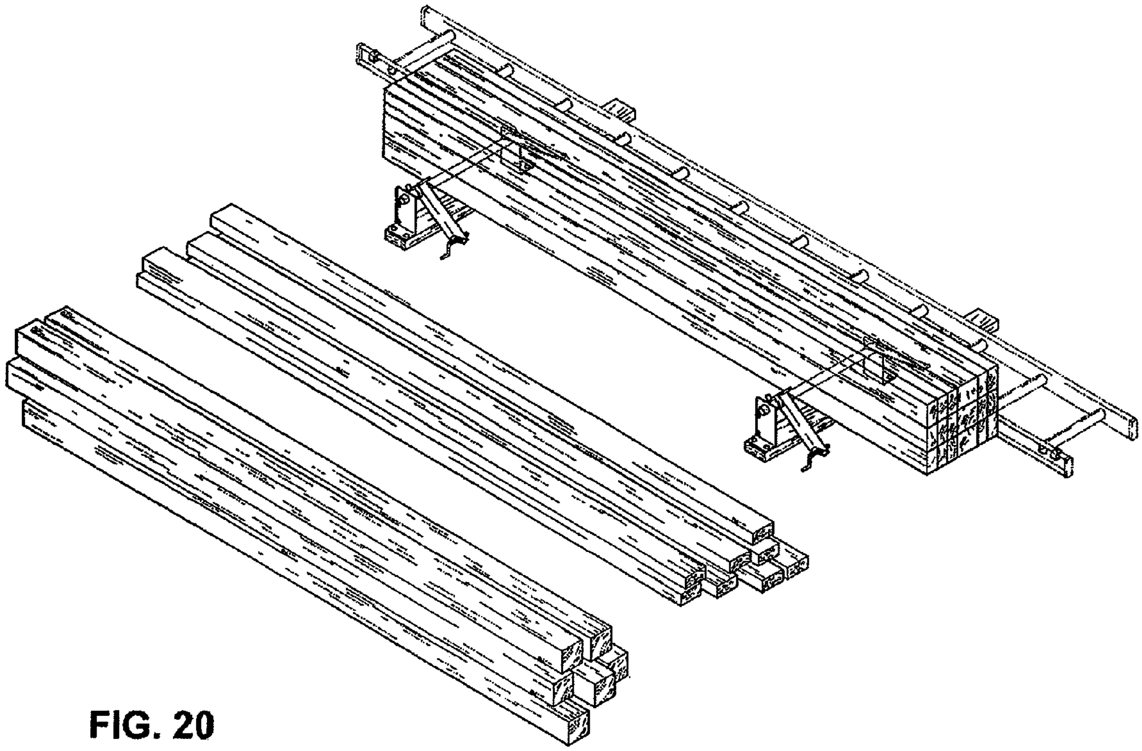

FIG. 14 shows a log mounted onto the log support bar (3), and held in place by the log dog (4). FIGS. 15-20 show the sawmill in use. The carriage base (18) (and, as a result, the sawhead) is moved to one end of the guide rails (130). A log is placed onto the log support bar (3) and is fixed in place using log dog (4). The sawhead and sawhead support (56) are adjusted vertically on the post (19) using crank handle (39) until the saw blade is at a desired height to cut the log at the desired depth to achieve the desired thickness. The carriage base (18) (and, as a result, the sawhead) is then moved horizontally along the guide rails using the push handle (50) to cut the log. Throughout, the throttle handle (44) on the push handle (50) is used to engage the throttle on the sawhead engine. Once a "slice" of the log has been cut, providing a plank of wood, the sawhead is returned to the starting position and adjusted downwards on the post (19) by turning the crank handle (39) to slide the vertical slide (33), and, as a result the sawhead down the post (19), to cut another "slice". The lumber scale (60) can be used to determine how far down to adjust the vertical slide (33).

It is to be understood that the present invention is not limited to the embodiments described above, but encompasses any and all embodiments within the scope of the following claims.

What is claimed is:

1. A method for constructing a device for holding and moving a powered sawhead having a powered saw blade along a linear path using a portable guide rail base, comprising:

- selecting the portable guide rail base which has a first side member extending lengthwise, a second side member extending lengthwise, and rungs extending perpendicularly between said first side member and said second side member, wherein at least one side member comprises a guide rail base flange extending lengthwise located on top of the portable guide rail base;
- slidably attaching a carriage base to said portable guide rail base by a slidable attachment, said carriage base having an assembly capable of engaging either said first side member, said second side member, or both the first side member and the second side member, said carriage base having an inner flange and an outer flange, and said slidable attachment being connected by said outer flange resting on an outer surface of said guide rail base flange and said inner flange resting on an inner surface of said guide rail base flange; such that, when attached, the carriage base is movable via a portion of the carriage base sliding along at least one rail defined by said side member(s);
- attaching a bottom end of a vertical post to a bottom end to the carriage base;
- slidably attaching a vertical slide to said vertical post so that said vertical slide extends horizontally therefrom and is capable, when extending horizontally from said post, of slidable vertical displacement along said post, said displacement being lockable;
- attaching said vertical slide to said powered sawhead so that, when the device is so constructed, and said portable guide rail base is in a generally horizontal position, the powered saw blade is capable of cutting in a generally horizontal plane via movement of the carriage base along the at least one rail defined by said side member(s) of the portable guide rail base.

2. The method of claim 1, wherein the vertical post and the vertical slide are of close contact sleeve construction.

3. The method of claim 1, wherein the portion of the carriage base that slides along the at least one rail comprises a wheel assembly for enabling the horizontal movement.

4. The method of claim 3, wherein the wheel assembly further comprises a fixed flanged wheel and an adjustable flanged wheel, and the method further comprises:

- fitting the fixed flanged wheel onto, and abutting against an inside upper lip of, the first side member or the second side member; and
- fitting the adjustable flanged wheel under, and abutting against, an outside lower lip of the first side member or the second side member.

5. The method of claim 1, further comprising attaching a push handle to the carriage base and extending to the opposite side of the saw blade, for displacing the device horizontally along the portable guide rail base.

6. The method of claim 5, further comprising:

attaching a throttle handle on said push handle, said throttle handle being connected to a throttle activator; and attaching said throttle activator to the powered sawhead in a manner such that the throttle activator is capable of activating a throttle of said powered sawhead.

7. The method of claim 1, wherein the device has an outrigger arm having an outrigger wheel assembly and an adjustable connection allowing for varying, lockable distances between the outrigger wheel assembly and the end of the outrigger arm, further comprising:

connecting said outrigger arm to the carriage base;

adjusting the distance between the carriage base and the outrigger wheel assembly such that a wheel of the outrigger wheel assembly can be placed on the second side member of the portable guide rail base;

placing the wheel of the outrigger wheel assembly on the second side member of the portable guide rail base in a manner such that, when the portable guide rail base is placed in a generally horizontal position, the outrigger arm is capable of generally horizontal movement along said second side member.

8. The method of claim 7, wherein the outrigger wheel assembly is a twin, non-flanged wheel assembly.

9. The method of claim 1, wherein the vertical slide comprises a horizontally projecting sawhead support plate capable of being affixed to the vertical slide and further capable of being affixed to a powered sawhead having a saw blade, further comprising:

affixing the support plate to the powered sawhead;

affixing the support plate to the vertical slide.

* * * * *